March 9, 1971  J. V. HASSELL  3,568,355

SLIDING FISHING SINKER

Filed Aug. 29, 1969

INVENTOR.
JACK V. HASSELL
BY
Alexander B. Blair
ATTORNEY.

United States Patent Office 3,568,355
Patented Mar. 9, 1971

3,568,355
SLIDING FISHING SINKER
Jack V. Hassell, 902 Del Paso Blvd., Space 3,
Sacramento, Calif. 95815
Filed Aug. 29, 1969, Ser. No. 854,043
Int. Cl. A01k 93/00, 95/00
U.S. Cl. 43—43.13                                7 Claims

ABSTRACT OF THE DISCLOSURE

A rib-like body is fixed to and preferably integral with a thin widened base portion centrally thereof whereby the device is of elongated T-shaped cross-section. Two openings extend longitudinally through the body adjacent vertically spaced edges thereof, one of these openings being adapted to receive one or more lead weights and the fishing line being adapted to extend through the other opening, namely the one adjacent the base. The swivel and leader are connected to such line after it is threaded through its opennig. When so used, the weighted edge portion of the body will be at the bottom of the device. The line may be passed through the opening which usually carries the weights and the latter are eliminated, in which case the base will be at the bottom of the device so that the latter may be used in trolling, one end of the base projecting beyond the body to tend to draw the device downwardly from the surface of the water.

BACKGROUND OF THE INVENTION

Many fishing lures and sinkers have been devised with various theoretical advantages, but they all possess a serious disadvantage in that they are fixed to the line so that when a fish bites, it will jerk the sinker or lure, thus frequently scaring the fish away. This is particularly disadvantageous when catching fish with tender mouths, since the inertia of the sinker when the hook is jerked, will frequently cause the hook to be dislodged from the mouth of the fish.

SUMMARY OF THE INVENTION

The present device is preferably made of clear transparent plastic so as to be substantially invisible to the fish when it is in the water. The device is of elongated T-shaped cross-section having a vertical body and a transversely widened base forming the cross of the T, and which base will be either at the top or bottom of the device, depending on the manner in which it is used. The body has elongated vertically spaced longitudinal edges one of which is adjacent the base and is provided with an opening therethrough through which extends a line when ordinary fishing is to be indulged in. The longitudinal edge spaced from the base is provided throughout the greater portion of its length with an opening of greater diameter extending into the one end of the device and communicating at its other end with a smaller opening extending through the other end of the body. When the line extends through the opening adjacent the base, the end of the line threaded through such opening is connected to one end of a swivel, the other end of which is connected to a leader carrying the usual hooks of the desired type. When so used, the larger opening in the edge of the body remote from the base is provided with one or more small lead weights and the end of the opening is then plugged with a cork or the like to retain the weights in position. In such case, the device will float with the base at the top thereof.

The device is also useful in trolling, in which case the lead weights are eliminated and the line is threaded through the opening in which the weights otherwise would be arranged. In such case, the base will be at the bottom of the device and its forward end projects beyond the body and curves downwardly so that it tends to seek a lower level. The deeper the trolling is to be carried out, the longer will be the line employed.

DESCRIPTION OF THE PREFERRED EMBODIMENTS

Figure 3:
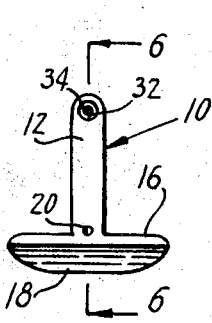
FIG. 3 is an end elevation looking at the left-hand end of FIG. 2.
Figure 1:
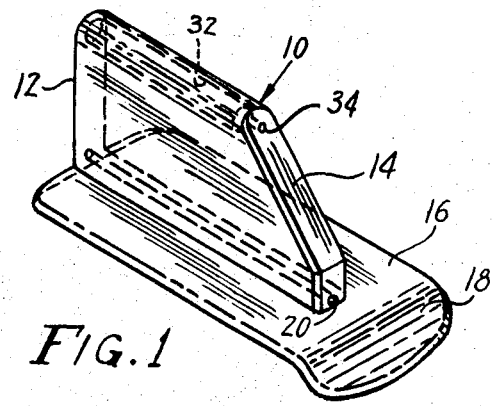
FIG. 1 is a perspective view of the device.
Figure 4:
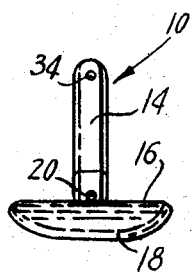
FIG. 4 is a similar view looking at the right-hand end of FIG. 2.

Referring to the drawing the numeral 10 designates the body of the device which is in the form of a relatively narrow vertical rib which is horizontally elongated and preferably has one end equared off as at 12 and its other or forward end sloping downwardly and forwardly as at 14. This body is preferably but not necessaily formed integral with a relatively thin base 16 projecting substantially laterally beyond the body 10 so that the device in cross-section is of normal or inverted T-shape, according to the manner in which it is used as described below. The forward end of the base 16 curves downwardly as at 18 for a purpose to be described.

The longitudinal edges of the body 10 are spaced from each other and the edge portion of the body adjacent the base 16 is provided with an opening 20 therethrough through which may be threaded a fishing line 22. After this line is threaded through the opening 20 from the forward or right-hand end thereof as viewed in FIG. 8, the rear end of the line is tied as at 24 to one end of a conventional swivel 26, the other end of which is tied as at 28 to a conventional leader 30 to which the hook or hooks are attached.

Figure 6:
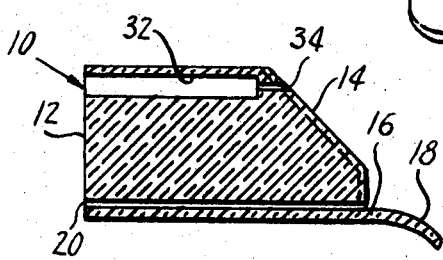
FIG. 6 is a vertical longitudinal section on line 6—6 of FIG. 3.

The free longitudinal edge of the body 10, that is, the edge remote from the base 16, is provided throughout the greater portion of its length with an opening 32 of larger diameter than the opennig 20 and opening through the rear end of the body. The forward end of the larger opening terminates in spaced relation to the sloping edge 14, and a small opening 34 extends through such sloping surface 14 as clearly shown in FIG. 6. When used in conventional line fishing, one or more lead weights 36 may be inserted in the opening 32 from the rear end thereof, whereupon the rear end of the opening 32 is plugged as at 38 by a cork or the like.

When the device is to be used trolling, a fishing line 40 (FIG. 2) is threaded through the small opening 34 in the forward end of the body, thence through the larger opening 32, and from the rear end thereof to be provided with the usual swivel, leader and hook. In such case, of course, the curved end 18 of the base will extend forwardly and downwardly.

OPERATION

Figure 8:
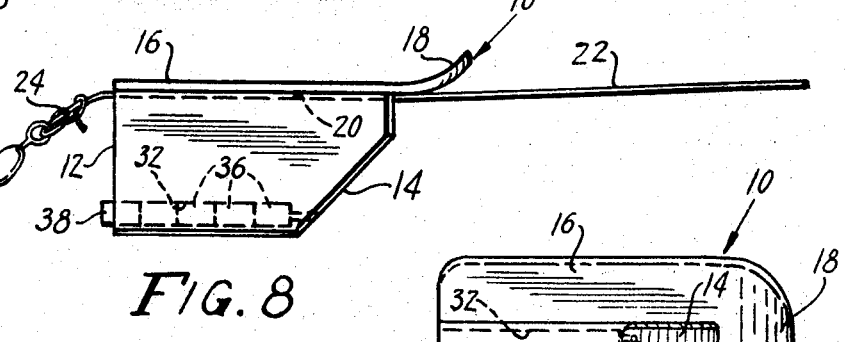
FIG. 8 is a side elevation of the device used in conventional fishing.
Figure 7:
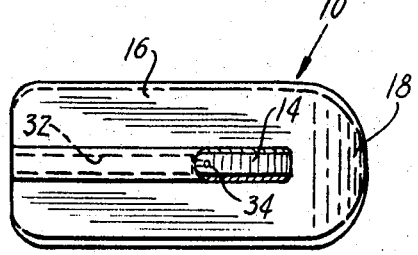
FIG. 7 is a plan view of the device as it appears in FIGS. 1 and 2.

In conventional line fishing, the device will be used as shown in FIG. 8 and the lead weights 36 may be employed in any desired number according to the whim of the fisherman or the depth at which the fishing is to be done. These weights, of course, overbalance the body 14 so that the latter projects downwardly from the base 16 as shown in FIG. 8.

The device is preferably formed of clear, colorless fiberglass or the like, and in the water, the device will be substantially invisible to the fish. The line 22 is freely slidable through the opening 20. When a fish nibbles the bait, the line 22 is free to slide to the left in FIG. 8 and the inertia of the present device and its resistance to passage through the water does not tend to jerk the hook. Thus the fish is not frightened away, and there is no jerk to tend to pull the hook from the fish having a tender mouth. Having pulled the bait and hook in the manner stated, the fisherman may pull the line to set the hook and land the fish.

Figure 2:
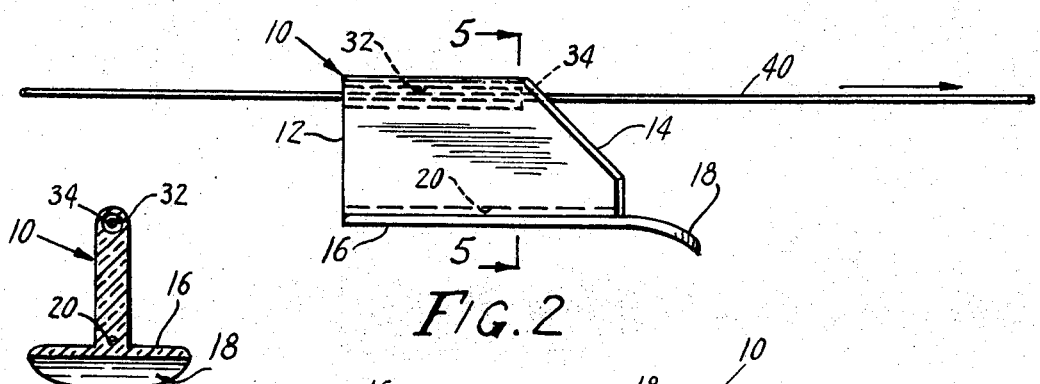
FIG. 2 is a side elevation of the device used when trolling.
Figure 5:
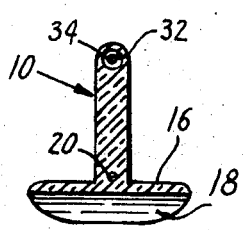
FIG. 5 is a detail section on line 5—5 of FIG. 2.

When the device is to be used in trolling, the weights 36 are eliminated and the line 40 is threaded through the openings 34 and 32 as shown in FIG. 2 and the left-hand end of the line is connected to the usual fishing tackle. Here again, the line will slide freely through the openings 32 and 34 so that a fish taking the bait can carry the line a short distance without the instantaneous jerking out which occurs with sinkers and lures in fixed relation to the hooks. When so used, the body 10 will project upwardly as in FIGS. 1 to 5, inclusive. In moving a boat through the water and trolling, the downwardly curved end 18 of the base tends to cause the device to seek a lower level in the water. The shorter the line from the device to the fisherman, the greater will be the angle of the line to the horizontal, in which case the curved end 18 will not take the device substantially below the surface of the water. In deeper trolling, the fisherman will merely pay out more line to reduce the angle of the line to the horizontal, in which case the curved end 18 will tend to plane the device to a greater depth where the fish are though to be feeding.

It will be apparent, of course, that in fishing with the present device, the slidable mounting of the device on the line is such that the device will slide downwardly along the line until it contacts the tie 24 which limits its downward movement. However, when a fish takes the bait and moves away, the device will remain relatively stationary, which is one of the important features of the invention.

From the foregoing it will be apparent that the present device, whether used for line fishing or trolling, permits free movement of the line relative to the device to prevent instantaneously jerking the hook when the fish takes the bait. The device without alteration may be used for either type of fishing, the only change being the use or elimination of the lead weights 36.

It should be noted that body 10 will not snag on the water bottom because when a rock or other obstruction is encountered by curved end 18, body 10 will tilt forward until curved end 18 slides over the obstruction. It should also be noted that jerking the line in the same manner as when hooking a fish brings body 10 almost immediately to the surface where it will remain provided there is tension similar to that normally required to reel in the line.

From the foregoing it will now be seen that there is herein provided an improved sliding fishing sinker which accomplishes all of the objects of this invention and others, including many advantages of great practical utility and commercial importance.

As various embodiments may be made of this inventive concept, and as many modifications may be made in the embodiments hereinbefore shown and described, it is to be understood that all matter herein is to be interpreted merely as illustrative, and not in a limiting sense.

I claim:
1. A sliding fishing sinker comprising an elongated body having a continuous unobstructed opening therethrough to receive a line slidable therein for connection at one end to a swivel whereby, when a fish takes the bait and pulls the leader which is connected between the swivel and hook the line will be pulled through said opening without imparting movement to said body, said body being relatively thin transversely, and a base being fixed to one longitudinal edge of said body and projecting laterally therefrom, said opening being adjacent the longitudinal edge of said body remote from said base, said body having a forward end and said base extending beyond such end and being curved downwardly for preventing snagging at the bottom by allowing said body to tilt and slide over an obstruction.

2. A sliding fishing sinker comprising an elongated body having a continuous unobstructed opening therethrough to receive a line slidable therein for connection at one end to a swivel whereby, when a fish takes the bait and pulls the leader which is connected between the swivel and hook the line will be pulled through said opening without imparting movement to said body, said body being relatively thin transversely, and a base being fixed to one longitudinal edge of said body and projecting laterally therefrom, a second unobstructed longitudinal opening through said body adjacent said base and through which the fishing line is adapted to slidably extend, the opening adjacent the longitudinal edge of said body remote from said base being adapted to contain a sinker weight.

3. A fishing sinker according to claim 2 wherein said last-mentioned opening is of greater diameter than the other opening and is adapted to contain at least one sinker weight, said larger opening terminating in spaced relation to the forward end of said body and the latter having a relatively small opening communicating between the forward end of said larger opening and the forward end of said body for the extension through said larger opening and said smaller opening of a fishing line when no weight is contained in said larger opening.

4. A fishing sinker according to claim 3 wherein, when the fishing line extends through said larger and smaller openings, said base is arranged at the bottom of said body, said base extending beyond the forward end of said body and being turned downwardly to tend to plane the sinker downwardly for trolling.

5. A fishing sinker according to claim 2 wherein said last-mentioned opening is of greater diameter than the other opening and extends from the rear end of said body to a point spaced from the forward end thereof to receive one or more sinker weights slid thereinto, and a plug in the rear end of such opening to prevent the loss of sinker weights therefrom.

6. A device according to claim 2 wherein said base extends laterally substantially beyond said body and is relatively flat throughout the length of said body, said body having a forward end beyond which the forward end of said base extends, said projecting end of said base being turned downwardly.

7. A fishing sinker according to claim 2 wherein said body has a forward end and said base extends beyond such end and being curved downwardly for rapidly rising to the water surface when said body is inverted and jerked by the fisherman and for remaining on the water surface under line tension normally required to reel the line in.

References Cited

UNITED STATES PATENTS

| | | | |
|---|---|---|---|
| 2,119,504 | 5/1938 | Lawrence | 43—43.13X |
| 2,798,332 | 7/1957 | Garrison | 43—44.97 |
| 3,091,050 | 5/1963 | Metzler | 43—44.88 |
| 3,104,488 | 9/1963 | Hicks | 43—44.88 |
| 3,111,784 | 11/1963 | Baker | 43—44.88X |
| 3,273,278 | 9/1966 | Lynch | 43—44.87 |
| 3,341,966 | 9/1967 | Pippen | 43—44.88X |

SAMUEL KOREN, Primary Examiner

J. F. PITRELLI, Assistant Examiner

U.S. Cl. X.R.

43—43.14, 43.15, 44.97